United States Patent [19]
Lee

[11] Patent Number: 6,091,029
[45] Date of Patent: *Jul. 18, 2000

[54] WEIGHT SENSING DEVICE FOR A MICROWAVE OVEN

[75] Inventor: Jong-Cheol Lee, Incheon, Rep. of Korea

[73] Assignee: Daewoo Electronics Co., Ltd., Seoul, Rep. of Korea

[*] Notice: This patent is subject to a terminal disclaimer.

[21] Appl. No.: 09/200,849

[22] Filed: Nov. 30, 1998

[30] Foreign Application Priority Data

Oct. 20, 1998 [KR] Rep. of Korea ............ 98-43959

[51] Int. Cl.[7] ............ G01G 3/14; G01G 19/00; H05B 1/02; H05B 6/50
[52] U.S. Cl. ............ 177/210 C; 177/245; 219/708; 219/518
[58] Field of Search ............ 177/210 C, 245; 361/290, 291; 73/862.626; 219/708, 518, 509

[56] References Cited

U.S. PATENT DOCUMENTS

| | | | |
|---|---|---|---|
| 4,676,328 | 6/1987 | Morino | 177/210 C |
| 4,875,533 | 10/1989 | Mihara et al. | 177/210 C |
| 4,913,248 | 4/1990 | Zakai | 177/210 C |
| 5,349,138 | 9/1994 | Dong | 177/210 C |
| 5,672,850 | 9/1997 | Liu | 177/210 C |
| 5,712,451 | 1/1998 | Lee | 177/210 C |

FOREIGN PATENT DOCUMENTS

598 658 A1  5/1994  European Pat. Off. .

*Primary Examiner*—Randy W. Gibson
*Attorney, Agent, or Firm*—Pillsbury Madison & Sutro LLP

[57] ABSTRACT

A weight sensing device for a microwave oven. The device has a fixing bracket having a bottom wall defined by a depress portion and a pair of protuberance portions which are provided at both ends of the depress portion and vertically ascending therefrom, and a pair of side walls which are integrally formed with side ends of the pair of protuberance portions and upwardly extending therefrom, a printed circuit board rested on the depress portion of the fixing bracket and provided at an upper surface thereof with a fixed electrode plate, an elastically movable electrode plate which is supported on the protuberance portions in a form of a fixed beam such that a predetermined gap is formed between the fixed electrode plate and the elastically movable electrode plate, a motor assembly which is mounted on an upper portion of the fixing bracket and is rotatably supporting a tray in which articles are placed, and a microcomputer determining the weight of articles based on the capacitance value. The motor assembly elastically descends the elastically movable electrode plate in proportional to a weight of articles, thereby varying a capacitance value. The device has a simple construction and can accurately measure the weight of the foodstuffs.

12 Claims, 5 Drawing Sheets

WEIGHT SENSING DEVICE FOR A MICROWAVE OVEN

BACKGROUND OF THE INVENTION

1. Field of the Invention

The present invention relates to a weight sensing device, and more particularly to a weight sensing device for a microwave oven, which detects a food weight by computing a variation of a capacitance between two electrode plates.

2. Prior Arts

As is well known, a microwave oven is an appliance for heating a food by passing microwaves through the food. Generally, the microwave oven has a magnetron which generates microwaves when a high-voltage is applied thereto. In the microwave oven, the magnetron generates approximately 2,450 MHz microwaves. When the high-frequency microwaves are applied to the food contained in a heating chamber, particles of the food rapidly move so that a frictional heat is generated due to a friction between the particles. The microwave oven heats the food by using the frictional heat.

These high-frequency microwaves are generated when a high-voltage produced by primary and secondary induction coils of a transformer disposed at a bottom wall of a cabinet is supplied to the magnetron, and such microwaves are radiated into the heating chamber through a wave guide.

A user may select a cooking time according to a weight of the food to be heated. However, it is difficult for the user to find an accurate weight of the foodstuff. So, without knowing the accurate food weight, it is also difficult for the user to select an accurate cooking time.

In order to overcome the above problems, many kinds of microwave ovens having a weight sensing device therein for setting a cooking time according to a food weight have been suggested. Recently, a weight sensing device utilizing a variation of a capacitance is adopted in the microwave oven.

Figure 1:
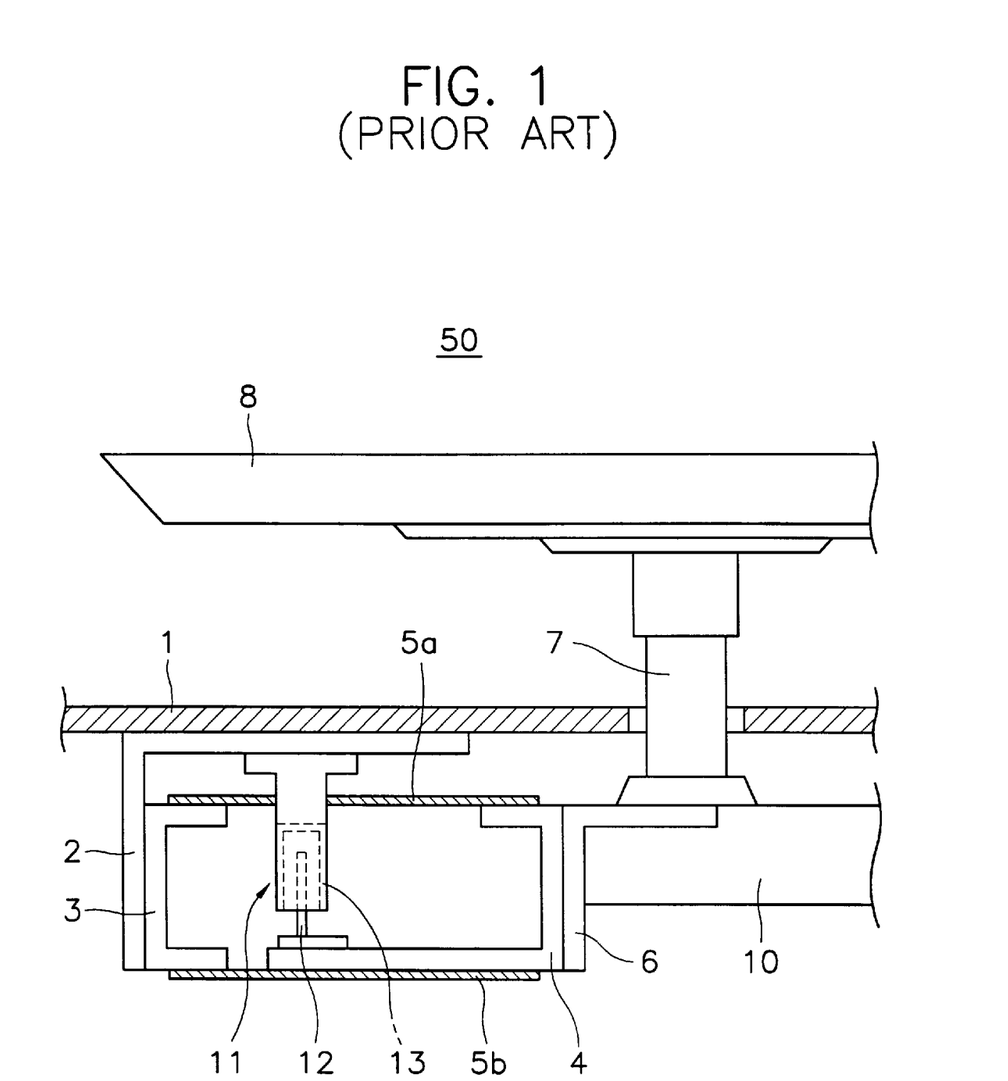
FIG. 1 is an exploded perspective view showing a conventional weight sensing device of a microwave oven.

For example, U.S. Pat. No. 5,349,138 issued to Eun S. Dong discloses a weight sensing device for a microwave oven in which a food weight is detected by variation of the capacitance which varies according to an overlapping area between a movable electrode plate and a fixed electrode plate. FIG. 1 shows a weight sensing device 50 of Eun S. Dong.

As is well known, the capacitance is detected by the following equation:

$$C \in A/d$$

(wherein C represents the capacitance, $\in$ represents a dielectric constant of air, A represents the overlapping area of the electrode plates, and d represents a distance between the electrode plates).

As is understood from the above equation, when overlapping area A is constant, capacitance C is inversely proportional to distance d between the fixed electrode plate and the movable electrode plate, while when distance d is constant, capacitance C is proportional to overlapping area A between the fixed electrode plate and the movable electrode plate. That is, when distance d becomes shorter and overlapping area A becomes wider, capacitance C increases.

In weight sensing device 50 of Eun S. Dong, when the food is placed on a tray 8, a support bracket 6 supporting a rotating shaft 7 of tray 8 is moved downward together with a movable electrode plate 12. Accordingly, the overlapping area between a fixed electrode plate 13 and movable electrode plate 12 is reduced so that the capacitance decreases. A microcomputer (not shown) calculates the food weight according to the variation of the capacitance.

In order to vary the overlapping area between the electrode plates, support bracket 6 is attached to an outer surface of a moving spacer 4 at which movable electrode plate 12 is installed. In addition, moving spacer 4 is elastically connected to a fixing spacer 3 by a pair of leaf springs 5a and 5b.

However, in the above weight sensing device 50, support bracket 6 supporting rotating shaft 7 of tray 8 should also support a gear box 10, so an overload is applied to leaf springs 5a and 5b. This overload may reduce a restoring force of leaf springs 5a and 5b, so an efficiency of weight sensing device 50 may be reduced.

In addition, weight sensing device 50 requires many elements such as a fixing member 11 for installing fixed electrode plate 13, moving spacer 4 for installing movable electrode plate 12, fixing spacer 3, leaf springs 5a and 5b for elastically supporting moving spacer 4 and fixing spacer 3, support bracket 6, and a main bracket 2 for attaching the above elements to a base plate 1. Therefore, not only are many assembling steps required, but also the manufacturing cost of weight sensing device 50 increases.

In order to overcome the above problem, weight sensing devices having a simple construction, which detect the food weight by variation of a capacitance which varies according to a distance between a fixed electrode plate and a movable electrode plate, have been suggested.

For example, U.S. Pat. No. 5,712,451, which is issued to the inventor of this application and assigned to Daewoo Electronics co., Ltd., discloses such a weight sensing device for a microwave oven.

The above weight sensing device has a bracket attached to an underside of a bottom wall of the microwave oven, a motor assembly supported on the bracket, a movable electrode plate disposed between the bracket and the motor assembly, a fixed electrode plate disposed below the movable electrode plate, and a printed circuit board connected to the fixed electrode plate and having a high frequency generating circuit.

In the above weight sensing device, when foodstuffs are placed on a tray, an elastic piece of the movable electrode plate is downwardly biased by a rotating shaft of the motor assembly so that a distance between the movable electrode plate and the fixed electrode plate varies.

However, since the elastic piece of the movable electrode plate is formed as a cantilever beam with respect to the body of the movable electrode plate and is elastically moved up and down, when the movable electrode plate is used for a long time, a deformation of the movable electrode plate occurs thereby varying a restoring force of the elastic piece. This kind of deformation may cause a difference between a calculated food weight according to the variation of the capacitance and an actual food weight. When an error occurs, an initial weight value of the device, which is preset to zero, deviates from zero. Accordingly, the user should reset the initial weight by changing the overlapping area of the fixed electrode plate and the movable electrode plate. This resetting work requires to disassemble the microwave oven, so not only can time be consumed, but also a sensitivity of the device is lowered.

In addition, in order to change the overlapping area of the fixed electrode plate and the movable electrode plate, the movable electrode plate should be relatively large in size. Accordingly, the bracket for supporting the movable electrode plate should also have a relatively large size, so weight and manufacturing cost of the device increases.

SUMMARY OF THE INVENTION

The present invention has been made to solve the problems of the prior arts, and accordingly, it is an object of the present invention to provide a weight sensing device for a microwave oven, which has a compact size and can accurately detect the weight of the foodstuffs even when it is used for a long time.

To accomplish the above object of the present invention, there is provided a weight sensing device comprising:

a fixing bracket having a bottom wall defined by a depress portion and a pair of protuberance portions which are provided at both ends of the depress portion and vertically ascending therefrom, and a pair of side walls which are integrally formed with side ends of the pair of protuberance portions and upwardly extending therefrom;

a printed circuit board rested on the depress portion of the fixing bracket and provided at an upper surface thereof with a fixed electrode plate;

an elastically movable electrode plate which is supported on the protuberance portions in a form of a fixed beam, in such a manner that a predetermined gap is formed between the fixed electrode plate and the elastically movable electrode plate;

a motor assembly which is mounted on an upper portion of the fixing bracket and is rotatably supporting a basket in which articles are placed, the motor assembly elastically descending the elastically movable electrode plate proportional to a weight of articles, thereby varying a capacitance value; and a microcomputer determining the weight of articles based on the capacitance value.

According to a preferred embodiment of the present invention, the fixed electrode plate is connected to a high frequency generating circuit which transforms the capacitance into high frequency signals and sends the high frequency signals to the microcomputer. The microcomputer determines the weight of articles by comparing the high frequency signals with a predetermined look-up table.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE INVENTION

Hereinafter, the present invention will be described in detail with reference to the accompanying drawings. The same element has the same reference number.

Figure 2:
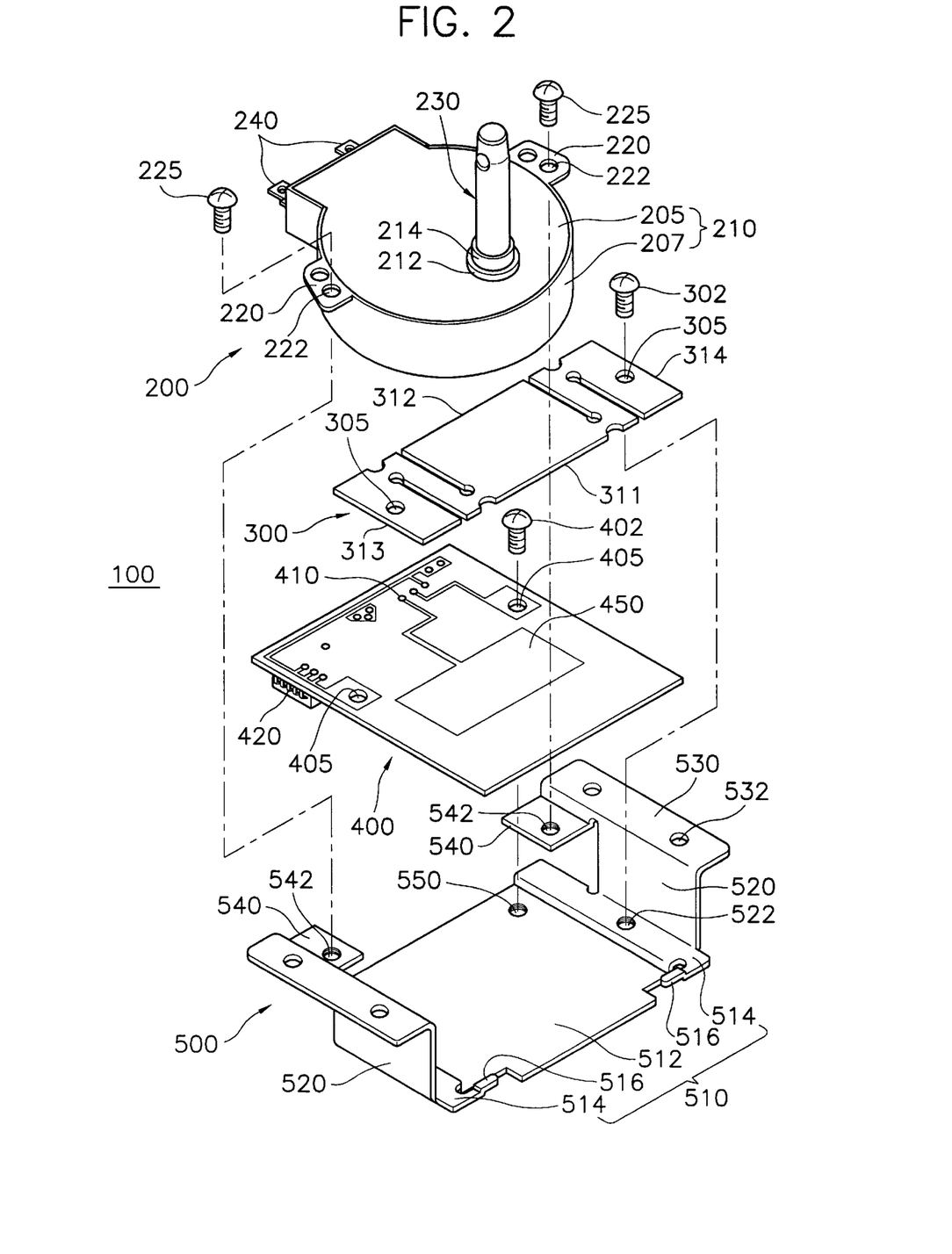
FIG. 2 is an exploded perspective view showing a weight sensing device of a microwave oven according to one embodiment of the present invention.

FIG. 2 shows a weight sensing device 100 for a microwave oven according to the preferred embodiment of the present invention. As shown in FIG. 2, weight sensing device 100 has a fixing bracket 500 attached to an underside of a heating chamber of the microwave oven. Fixing bracket 500 has a bottom wall 510 and a pair of side walls 520 which are integrally formed with side ends of bottom wall 510. Bottom wall 510 is defined by a depress portion 512 and a pair of protuberance portions 514 which are provided at both ends of depress portion 512 and vertically ascending therefrom. Side walls 520 are integrally formed with both ends of the pair of protuberance portions 514 and upwardly extending therefrom.

The pair of side walls 520 of fixing bracket 500 are integrally provided at upper rear ends thereof with a pair of support plates 540 which extend towards depress portion 512. In addition, at terminal ends of side walls 520, there are provided a pair of fixing plates 530 which extend opposite to support plates 540 so as to be attached to the underside of the heating chamber. Each fixing plate 530 has a first through hole 532 which allows fixing plate 530 to be screw-coupled to the underside of the heating chamber. Each protuberance portion 514 is integrally provided at a front end thereof with a gripping member 516 which is bent and extended toward depress portion 512.

Weight sensing device 100 further has a printed circuit board 400 rested on depress portion 512 of fixing bracket 500 which is provided at an upper surface thereof with a fixed electrode plate 450 connected to a high frequency generating circuit 410. High frequency generating circuit 410 is connected to a microcomputer 420 which is attached to an underside of printed circuit board 400. High frequency generating circuit 410 transforms a capacitance into high frequency signals and sends the high frequency signals to microcomputer 420. Then, microcomputer 420 determines the weight of foodstuffs by comparing the high frequency signals with a predetermined look-up table.

Printed circuit board 400 has a pair of second through holes 405. When printed circuit board 400 is rested on depress portion 512, a pair of first screws 402 are screw-coupled into first screw holes 550, which are formed at a rear end of depress portion 512, through second through holes 405 thereby fixing printed circuit board 400 to fixing bracket 500. In order to prevent printed circuit board 400 from being deformed by an ambient heat which is generated while the microwave oven is being operated, gripping members 516 grip an upper surface of printed circuit board 400.

Figure 3:
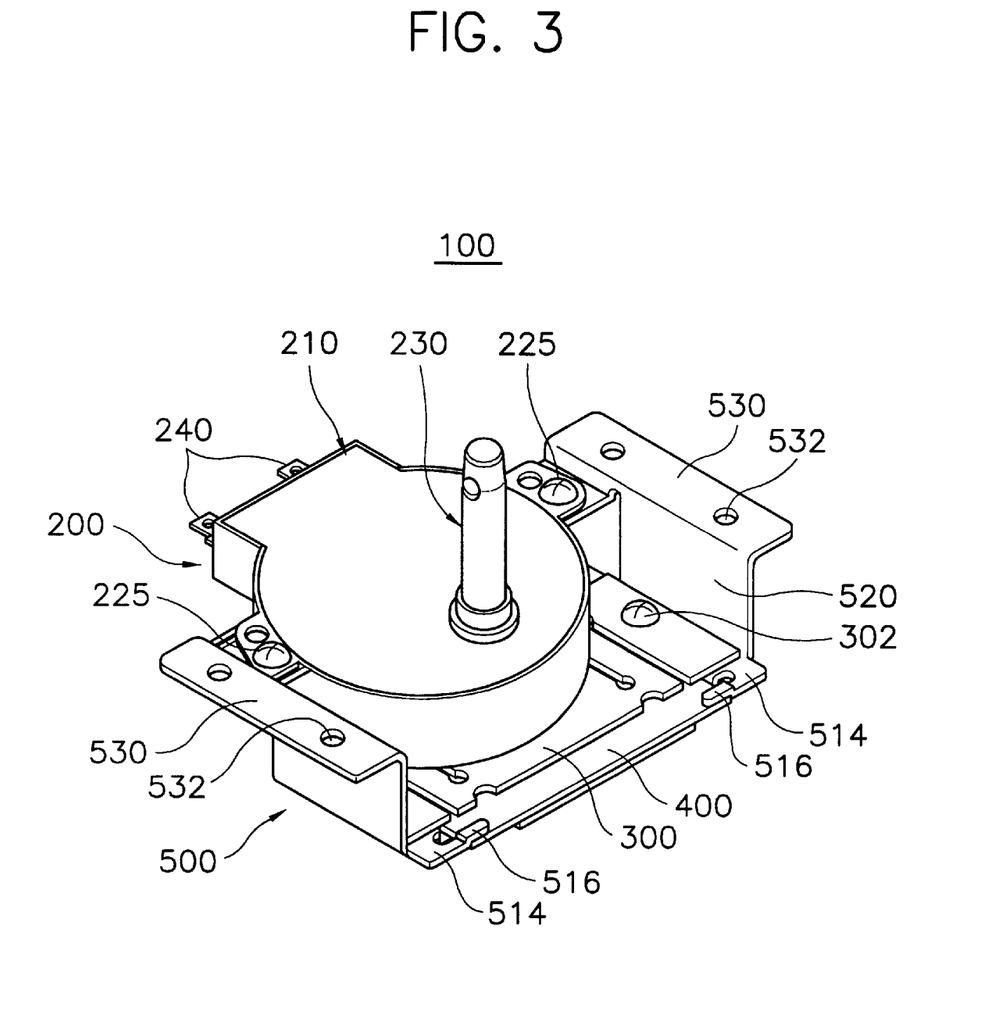
FIG. 3 is an assembled perspective view showing a weight sensing device of a microwave oven according to one embodiment of the present invention.

That is, as shown in FIG. 3 in detail, a distance between an underside of gripping members 516 and a bottom of depress portion 512 is identical to a thickness of printed circuit board 400 so that one end of printed circuit board 400 is press-fitted between gripping members 516 and depress portion 512.

Referring again to FIG. 2, weight sensing device 100 further has an elastically movable electrode plate 300 which is supported on protuberance portions 514 in the form of a fixed beam in such a manner that a predetermined gap is formed between fixed electrode plate 450 and elastically movable electrode plate 300.

Elastically movable electrode plate 300 is a rectangular leaf spring having an upper wall 311, a lower wall 312, a first side wall 313, and a second side wall 314 opposite to first side wall 313. Elastically movable electrode plate 300 is formed, adjacent to first and second side walls 313 and 314, with a pair of third through holes 305 for allowing the rectangular leaf spring to be coupled to protuberance portions 514. When elastically movable electrode plate 300 is rested on protuberance portions 514, a pair of second screws 302 are screw-coupled into second screw holes 522, which are formed at protuberance portions 514, through third through holes 305, thereby fixing elastically movable electrode plate 300 to fixing bracket 500.

Figure 5:
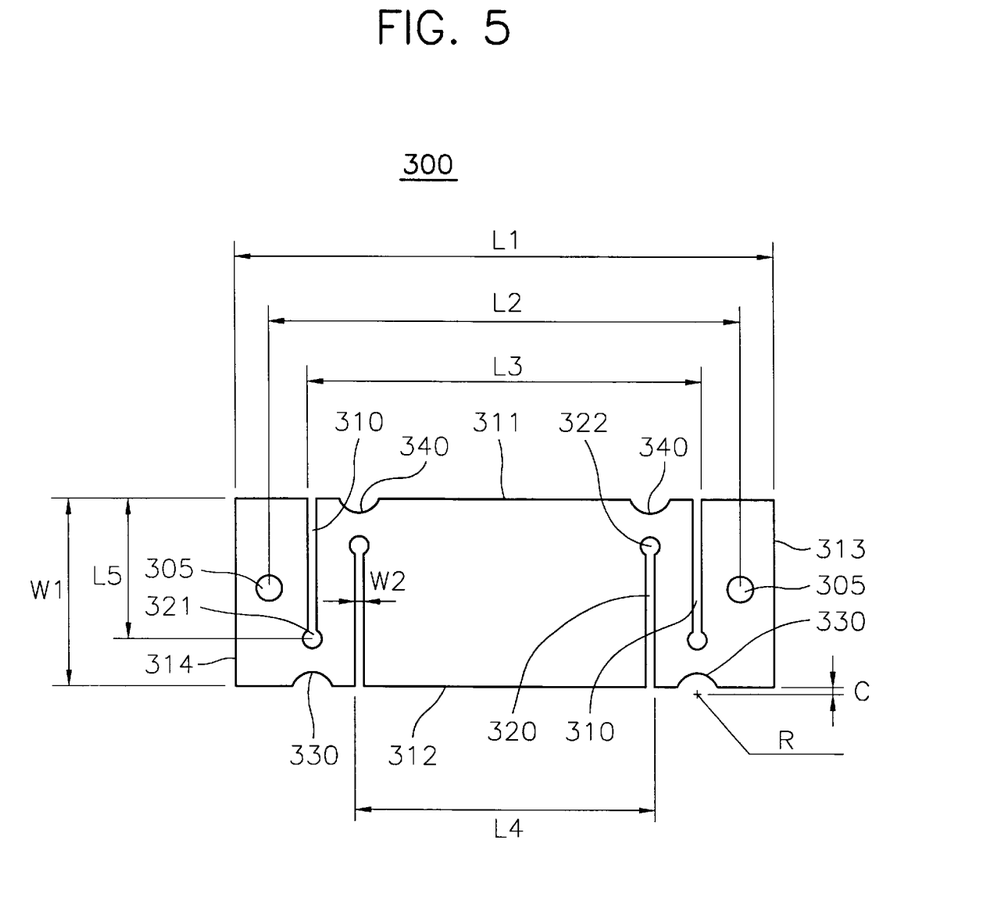
FIG. 5 is a plan view showing an elastically movable electrode plate shown in FIG. 2.

As shown in FIG. 5 in detail, in order to improve elasticity of elastically movable electrode plate 300, upper wall 311 is formed with a pair of first slots 310 which extend toward lower wall 312 in parallel to each other and lower wall 312 is formed with a pair of second slots 320 which extend toward upper wall 311 in parallel to each other. Second slots 320 have identical lengths and shapes to those of first slots 310 and are positioned between first slots 310. In addition, each first and second slot 310 and 320 is formed at an end portion thereof with a circular hole 321 and 322 having a predetermined diameter, respectively.

Lower wall 312 is formed with a pair of first arcuate concave portions 330 which are positioned in line with the pair of first slots 310, and upper wall 311 is formed with a pair of second arcuate concave portions 340 which are positioned in line with the pair of second slots 320.

In order to allow elastically movable electrode plate 300 to have a preferred elasticity, elastically movable electrode plate 300 is made of stainless steel, is manufactured by a press molding and is heat-treated in a temperature of 320° C. for 30 minutes.

On the other hand, sizes and positions of holes, slots, and concave portions of elastically movable electrode plate 300 are very important factors to determine the elasticity of elastically movable electrode plate 300. The inventor of the present invention has conducted many experiments and has obtained a fact that weight sensing device 100 has a better quality when elastically movable electrode plate 300 has the following structure.

That is, when a distance between first and second side walls 313 and 314 is L1, a thickness of elastically movable electrode plate 300 is 0.011–0.02 L1, a distance L2 between the pair of third through holes 305 is 0.88–0.89 L1, a distance W1 between upper wall 311 and lower wall 312 is 0.36–0.37 L1, a distance L3 between the pair of first slots 310 is 0.72–0.73 L1, a distance L4 between the pair of second slots 320 is 0.48–0.49 L1, a length L5 of each slot is 0.26–0.27 L1, a width W2 of each slot is 0.02–0.03 L1, a radius R of each arcuate concave portion is 0.04–0.05 L1, a diameter of each circular hole is 0.03–0.04 L1, and distances C from centers of first and second arcuate concave portions 330 and 340 to upper and lower walls 311 and 312 are 0.02–0.03 L, respectively.

More preferably, when the distance between first and second side walls 313 and 314 is 68 mm, a thickness of elastically movable electrode plate 300 is 0.8 mm, a distance L2 between the pair of third through holes 305 is 60 mm, a distance W1 between upper wall 311 and lower wall 312 is 25 mm, a distance L3 between the pair of first slots 310 is 49 mm, a distance L4 between the pair of second slots 320 is 33 mm, a length L5 of each slot is 18 mm, a width W2 of each slot is 1.5 mm, a radius R of each arcuate concave portion is 3 mm, a diameter of each circular hole is 2.4 mm, and distances C from centers of first and second arcuate concave portions 330 and 340 to upper and lower walls 311 and 312 are 1.5 mm, respectively.

Referring again to FIG. 2, weight sensing device 100 further has a motor assembly 200 which is mounted on an upper portion of fixing bracket 500. Motor assembly 200 includes a substantially cylindrical housing 210 having a body 207 and a cover 205 covering an upper portion of body 207. Cover 205 is formed with a first opening 212 and body 207 is formed at a bottom thereof with a second opening 266 (shown in FIG. 4). In addition, body 207 is provided at one end thereof with an electrode terminal 240. Body 207 is integrally formed at the upper portion thereof with a pair of projections 220 which are rested on supporting plates 540 of fixing bracket 500 and formed with fourth through holes 222.

As shown in FIG. 3, when projections 220 are rested on supporting plates 540, third screws 225 are screw-coupled into third screw holes 542, which are formed at supporting plates 540, through fourth through holes 222, thereby fixing motor assembly 200 to fixing bracket 500.

Figure 4:
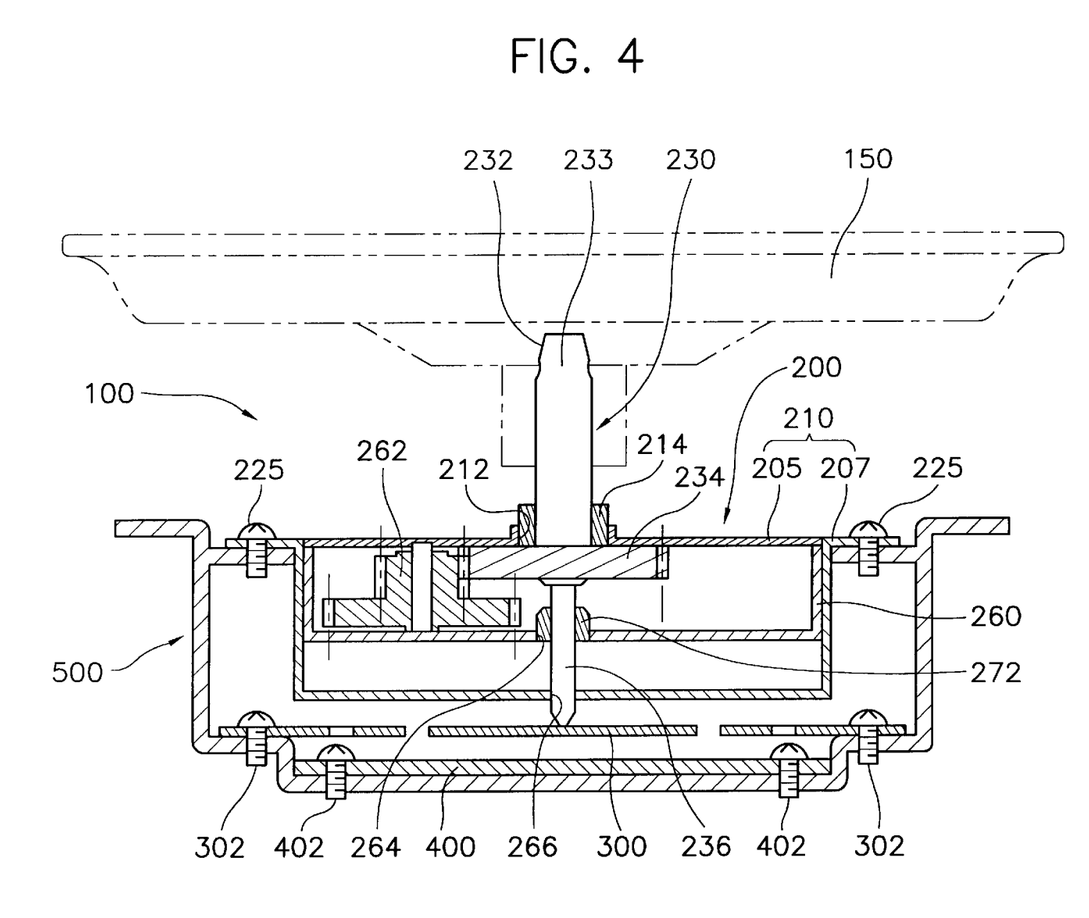
FIG. 4 is a sectional view of the weight sensing device of the microwave oven shown in FIG. 3.

Referring to FIG. 4, motor assembly 200 has a reduction gear assembly 262 installed in housing 210 and a rotating shaft assembly 230 which is coupled to reduction gear assembly 262. Although only one gear is shown in FIG. 4, reduction gear assembly 262 consists of plural gears and transfers a rotational force of a rotor (not shown) to rotating shaft assembly 230. Rotating shaft assembly 230 eccentrically passes through housing 210 by way of first and second openings 212 and 266 so as to allow reduction gear assembly 262 to be installed in housing 210. Reference number 260 is a gear box having a third opening 264 at a bottom thereof.

Rotating shaft assembly 230 is movable up and down with respect to housing 210 and connected to reduction gear assembly 262 and a tray 150 so as to rotate tray 150 by receiving the reduced rotational force from reduction gear assembly 262. When foodstuffs are placed on tray 150, rotating shaft assembly 230 is downwardly moved thereby descending elastically movable electrode plate 300. In addition, when foodstuffs are removed from tray 150, rotating shaft assembly 230 is returned to its initial position by a restoring force of elastically movable electrode plate 300.

Rotating shaft assembly 230 includes a first shaft 233 having a first end fixedly coupled to an underside of tray 150 and a second end opposite to the first end, a gear member 234 integrally formed with the second end of first shaft 233 and disposed in housing 210 so as to be engaged with reduction gear assembly 262, and a second shaft 236 integrally formed with an underside of gear member 234 and extending downward so as to make contact with a center of an upper surface of elastically movable electrode plate 300.

In addition, a metal bearing 214 is installed between first shaft 233 and housing 210 for reducing a frictional force of first shaft 233. Disposed between second shaft 236 and gear box 260 is a boss 272 which supports second shaft 236 and reduces a frictional force of second shaft 236.

The first end of first shaft 233 has a tapered portion 232 for facilitating the insertion of first shaft 233 into tray 150. In order to improve the weight sensitivity, a diameter of second shaft 236 is smaller than a diameter of first shaft 233.

Weight sensing device 100 having the above construction operates as follows.

Firstly, when the foodstuffs are placed on tray 150, rotating shaft assembly 230 is moved down due to the food weight. Accordingly, elastically movable electrode plate 300 which makes contact with second shaft 236 of rotating shaft assembly 230 is downwardly moved. Therefore, elastically movable electrode plate 300 becomes closer to fixed electrode plate 400 so that the capacitance increases.

Then, high frequency generating circuit 410 connected to fixed electrode plate 400 sends a high frequency signal based on the capacitance to microcomputer 420. Upon receiving the high frequency signal, microcomputer 420 compares the high frequency signal with an look-up table and determines the weight of the foodstuffs placed on tray 150.

When the food weight is determined, microcomputer 420 applies an electric signal to a display section provided at the front panel of the microwave oven so that a cooking time is displayed.

When the foodstuffs are removed from tray 150, rotating shaft assembly 230 is moved up by a restoring force of elastically movable electrode plate 300, so the capacitance is reset to an initial value.

On the other hand, since elastically movable electrode plate 300 is supported on protuberance portions 514 of fixing bracket 500 in the form of a fixed beam, elastically movable electrode plate 300 can maintain the elasticity even when it is used for a long time, so not only is a sensing error reduced, but also reliable operation of weight sensing device 100 is ensured.

Table. 1 shows the cooking time as a function of the weight of foodstuffs between the microwave oven having the weight sensing device of the present invention and the microwave oven having the conventional weight sensing device.

TABLE 1

| weight (g) | standard cooking time | cooking time (present invention) | cooking time (prior art) |
|---|---|---|---|
| 500 | 6'50"–9'50" | 8'20" ± 1'30" | 9'20" ± 1'40" |
| 800 | 11'20"–15'20" | 13'20" ± 2' | 14'40" ± 3'40" |
| 1000 | 14'10"–19'10" | 16'40" ± 2'30" | 17'40" ± 4'30" |

In above table 1, the standard cooking time represents the preferred cooking time for the weight of foodstuffs. As understood from table 1, the microwave oven having the weight sensing device of the present invention has a cooking time within a range of the standard cooking time. However, the conventional microwave oven has a cooking time deviated from the standard cooking time. In the conventional weight sensing device, the movable electrode plate is easily deformed, so the deviation range of the cooking time may increase as it is used for a long time.

As described above, the weight sensing device of the present invention has a compact size and accurately detects the weight of foodstuffs even when it is used for a long time.

Although the preferred embodiment of the invention has been described, it will be understood by those skilled in the art that the present invention should not be limited to the described preferred embodiment, but various changes and modifications can be made within the spirit and scope of the invention as defined by the appended claims. For example, the weight sensing device of the present invention can be applied to other appliances such as a small washing machine.

What is claimed is:

1. A weight sensing device comprising:

a fixing bracket having a bottom wall defined by a depress portion and a pair of protuberance portions which are provided at both ends of the depress portion and vertically ascending therefrom, and a pair of side walls which are integrally formed with side ends of the pair of protuberance portions and upwardly extending therefrom;

a printed circuit board rested on the depress portion of the fixing bracket and provided at an upper surface thereof with a fixed electrode plate;

an elastically movable electrode plate which is supported on the protuberance portions in a form of a fixed beam, in such a manner that a predetermined gap is formed between the fixed electrode plate and the elastically movable electrode plate;

a motor assembly which is mounted on an upper portion of the fixing bracket and is rotatably supporting a basket in which articles are placed, the motor assembly elastically descending the elastically movable electrode plate proportional to a weight of articles, thereby varying a capacitance value; and a microcomputer determining the weight of articles based on the capacitance value.

2. The weight sensing device as claimed in claim 1, wherein the fixed electrode plate is connected to a high frequency generating circuit which transforms the capacitance value into high frequency signals and sends the high frequency signals to the microcomputer, the microcomputer determining the weight of articles by comparing the high frequency signals with a predetermined look-up table.

3. The weight sensing device as claimed in claim 1, wherein each protuberance portion is provided at a front end thereof with a gripping member which grips the printed circuit board for preventing the printed circuit board from being deformed by an ambient heat.

4. The weight sensing device as claimed in claim 3, wherein the gripping member extends towards the depress portion, a distance between an underside of the gripping member and a bottom of the depress portion is identical to a thickness of the printed circuit board so that the printed circuit board is press-fitted between the gripping member and the depress portion.

5. The weight sensing device as claimed in claim 3, wherein the pair of side walls of the fixing bracket are integrally provided at upper rear ends thereof with a pair of support plates which extend towards the depress portion for supporting the motor assembly.

6. The weight sensing device as claimed in claim 3, wherein the elastically movable electrode plate includes a rectangular leaf spring having an upper wall, a lower wall, a first side wall, and a second side wall opposite to the first side wall, the rectangular leaf spring being formed, adjacent to the first and second side walls, with a pair of thruholes for allowing the rectangular leaf spring to be coupled to the protuberance portions, the upper wall being formed with a pair of first slots which extend toward the lower wall in parallel to each other for increasing a restoring force of the rectangular leaf spring, the lower wall being formed with a pair of second slots which extend toward the upper wall in parallel to each other for increasing a restoring force of the rectangular leaf spring, the second slots having a length and a shape identical to a length and a shape of the first slots and being positioned between the first slots, each first and second slot being formed at an end portion thereof with a circular hole having a predetermined diameter.

7. The weight sensing device as claimed in claim 6, wherein the lower wall is formed with a pair of first arcuate concave portions which are positioned in line with the pair of first slots, and the upper wall is formed with a pair of second arcuate concave portions which are positioned in line with the pair of second slots.

8. The weight sensing device as claimed in claim 7, wherein the elastically movable electrode plate is made of stainless steel, is manufactured by a press molding, and is heat-treated in a temperature of 320° C. for 30 minutes.

9. The weight sensing device as claimed in claim 7, wherein when a distance between the first and second side walls is L, a thickness of the elastically movable electrode plate is 0.01 1–0.02 L, a distance between the pair of thruholes is 0.88–0.89 L, a distance between the upper wall and the lower wall is 0.36–0.37 L, a distance between the pair of first slots is 0.72–0.73 L, a distance between the pair of second slots is 0.48–0.49 L, a length of each slot is 0.26–0.27 L, a width of each slot is 0.02–0.03 L, a radius of each arcuate concave portion is 0.04–0.05 L, a diameter of each circular hole is 0.03–0.04 L, and distances from centers of first and second arcuate concave portions to the upper and lower walls are 0.02–0.03 L, respectively.

10. The weight sensing device as claimed in claim 7, wherein the motor assembly includes a substantially cylindrical housing, a reduction gear assembly installed in the housing and a rotating shaft assembly which eccentrically passes through the housing, the rotating shaft assembly being movable up and down with respect to the housing and being connected to the reduction gear assembly and the basket so as to rotate the basket by receiving a reduced rotational force from the reduction gear assembly, the rotating shaft assembly being moved downward when articles are placed on the basket thereby descending the elastically movable electrode plate.

11. The weight sensing device as claimed in claim 10, wherein the rotating shaft assembly includes a first shaft having a first end fixedly coupled to an underside of the basket and a second end opposite to the first end, a gear member integrally formed with the second end of the first shaft and disposed in the housing so as to be engaged with the reduction gear assembly, and a second shaft integrally formed with an underside of the gear member and extending downward so as to make contact with a center of an upper surface of the elastically movable electrode plate.

12. The weight sensing device as claimed in claim 11, wherein a metal bearing is installed between the first shaft and the housing for reducing a frictional force of the first shaft, the first end of the first shaft being tapered, a diameter of the second shaft being smaller than a diameter of the first shaft.

* * * * *